L. H. PERLMAN.
WHEEL.
APPLICATION FILED SEPT. 23, 1916.
1,307,267. Patented June 17, 1919.
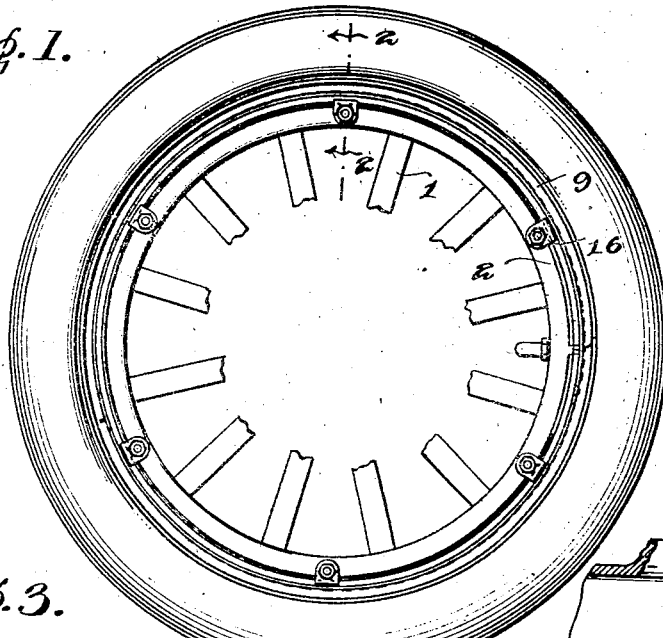
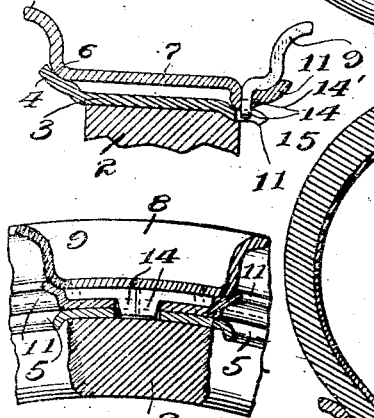
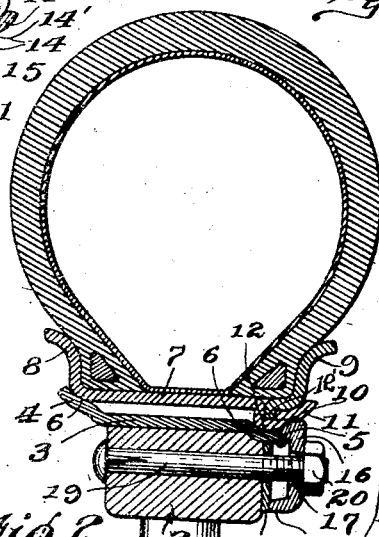
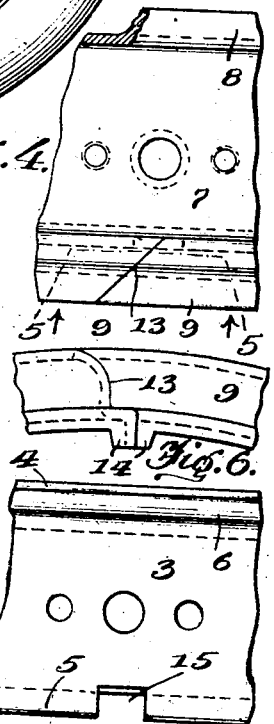
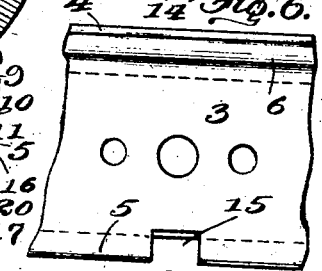
Witnesses
Horace N. Lybrand
C. H. Fesler
Inventor
Louis H. Perlman
By Edgar M. Kitchin,
his Attorney.

UNITED STATES PATENT OFFICE.

LOUIS H. PERLMAN, OF NEW YORK, N. Y.

WHEEL.

1,307,267.　　Specification of Letters Patent.　　Patented June 17, 1919.

Application filed September 23, 1916. Serial No. 121,829.

*To all whom it may concern:*

Be it known that I, LOUIS H. PERLMAN, a citizen of the United States, residing at New York city, in the county of New York and State of New York, have invented certain new and useful Improvements in Wheels; and I do hereby declare the following to be a full, clear, and exact description of the invention, such as will enable others skilled in the art to which it appertains to make and use the same.

This invention relates to improvements in vehicle wheels of the type especially well adapted for use on automobiles, and more particularly relates to that type of wheel structure which has come to be known as a quick-detachable demountable.

The object in view is the provision of an efficient tire locking means together with an efficient rim locking means so designed and operating relative to each other as not to conflict, and leaving each readily accessible for operation independent of the other.

In this art some difficulty has been experienced from the fact that the apparatus provided for retaining a removable flange on the demountable rim has rendered inaccessible apparatus for locking the demountable rim in place, and it is the object of this invention to overcome this difficulty.

With the above mentioned and further objects in view, the invention comprises certain novel constructions, combinations and arrangements of parts as subsequently specified and claimed.

In the accompanying drawing,—

Figure 1 is a view in side elevation of a wheel embodying the features of the present invention, the hub portion and parts of the spokes being broken away.

Fig. 2 is a section taken on the plane indicated by line 2—2 of Fig. 1.

Fig. 3 is a section similar to Fig. 2 but taken approximately in the plane of the cross-cut of the removable side flange.

Fig. 4 is a plan view of a fragment of the demountable rim.

Fig. 5 is a fragmentary view, partly in side elevation and partly in section, parts being broken away to disclose the section on the plane indicated by line 5—5 of Fig. 4 a portion of the wheel body being also shown.

Fig. 6 is a fragmentary side elevation of the terminal portions of the removable flange detached.

Fig. 7 is a fragmentary plan view of the wheel body.

Referring to the drawing by numerals, 1 indicates the spokes, 2 the wood felly, and 3 the felly band or fixed rim of the wheel body. The wheel body is of the ordinary type with the exception that the felly band has its inner edge formed with the usual outwardly-flaring stop flange 4, and has its outer edge formed with an inwardly-tapering or converging stop flange 5, the flange being shaped to have substantially the same contour as flange 4, but of less diameter, each being provided with an inclined wall 6. Mounted on the wheel body is a demountable rim 7 having at its inner edge the usual tire bead-engaging flange 8 which may be of any conventional type, and at its outer edge the tire bead-engaging flange 9 of similar shape. The flange 9, as is true of all ordinary Q. D. rims, is detachably connected with the rim 7 so as to be removed in order to enable the removal and replacement of tires having hard non-elastic marginal beads of approximately the same diameter as the outer face of the demountable rim.

The material of the rim 7 adjacent its outer edge is stamped inward to produce an inset annular groove 10 having straight radial walls for a short distance, and then the wall curving outward is formed into a slightly upwardly curved flange 11. That portion of the rim which is stamped to produce the groove 10 provides an underhanging annular shoulder 12 adapted in operation to rest against the curved portion 6 of flange 5. The uppermost edge of the flange 11 is of less diameter than the diameter of the outer face of the base of rim 7, so that when the flange 9 is not in place, the beads of a tire may pass readily across the flange 11. Beyond the planes of the outer face of the base of rim 7, the flange 9 is of the same contour as flange 8, but within those planes the flange curves to conform to the curvature of the upper face of flange 11, and is then bent to form an abruptly turned annular bead 12' fitting snugly within the groove 10.

The flange 9 is sprung into and out of place within the groove and is enabled to be thus sprung by virtue of the fact that it is cut at 13. The flange is held against accidental dislocation from its seat by having its ends formed with radially inwardly extending projections 14, 14, extending through aperture 14' formed through the material of rim 3 at one point of the base of groove 10.

The under face of the flange 11 is inclined upward from the flange 5 and the upper face of the flange 5 is inclined downward so as to provide an axial-opening substantially V-shaped groove into which groove extend the V-shaped or wedge ends of the locking plates 16 of which there are a number spaced preferably equally about the wheel. The number of plates will vary according to the size of the wheel, and each consists of a substantially flat plate apertured centrally, as at 17, and having at its inner end a lip or flange 18 adapted to engage the felly 2, and at its outer edge the wedging or tapered edge disposed between the flanges 5 and 11. The aperture 17 is flared inward to accommodate radial or rocking movement of the plate, the aperture being primarily intended to permit the passage of a retaining bolt 19 which extends through and is appropriately fixed in the felly 2. A nut 20 engages plate 16 for operatively actuating the same.

A wearing plate 21 is preferably fixed to the felly 2 to receive the wear from the flange 18 in lieu of having the flange directly engage the wood felly 2.

In operation, the tire is applied and removed substantially after the manner of manipulating the ordinary quick detachable rim structure, the operation consisting in prying out one of the projections 14 from aperture 14', as by inserting a tool between one end of the flange 9 and the flange 11, and springing the end of the flange 9 out of its seat. The flange is then sprung from the groove until a sufficient portion is out of the seat to enable the flange to be readily lifted away from the rest of the rim. It should be understood, of course, that this operation occurs when the tire is deflated. The defective tire is then removed with an axial sliding movement and a fresh tire replaced with a similar movement. Then one projection 14 is inserted through aperture 14', and the flange ring 9 is gradually worked into groove 10, upon completion of which the other projection 14 snaps through aperture 14', and the parts are thus rigidly locked together. The tire is then inflated and the rim is ready for use.

So far as the operation of the demountable feature of rim 7 is concerned, the rim may be readily removed by merely backing off the nuts 20, withdrawing the plates 16 and then sliding or rocking the rim 7 axially off of the wheel. The rim is replaced by a converse movement until the inner portion of the rim and the shoulder 12 strike the curved portions 6, and then the plates 16 are replaced and the nuts 20 threaded onto the bolts a sufficient distance for drawing up the plates and wedging the rim 7 to a tensioned position on the felly band, whereupon the parts are in condition for use.

It is obvious, of course, that instead of completely removing the plates 16, the nuts 20 may be backed off a distance sufficient to allow the plates to be revolved say for a quarter of a revolution so as to be out of the path of the rim 7.

It is to be noted that the detachable flange 9 is provided with an effective seat which in no way interferes with the accessibility of the locking wedges for the demountable rim.

The projections 14 are of sufficient length to extend through aperture 14' and beyond the shoulder 12 so as to extend into a notch 15 formed in the felly band 3. The notch 15 is of sufficient depth axially to allow the rim 7 to be forced axially by the action of the wedge 16 but the dimension of the notch 15 in the direction of the circumference of the rim is such as to snugly receive the free ends of the projections 14 so that said projections may serve as a driver to prevent creeping of the demountable rim on the wheel body; that is to say, to prevent relative angular shifting of said parts. Additional drivers may be employed if desired but ordinarily the projections 14 and their engagement with the end walls 15 will be found adequate.

What I claim is:—

A demountable rim comprising a substantially cylindrical main body and a tire bead retaining flange at one edge, the main body being formed with a seat for a tire bead retaining flange at the other edge, the said seat being shaped into an annular groove having relatively abrupt corners opening into a substantially axially extending portion curving gradually in a direction away from the axis of the rim and having its free edge of a diameter not exceeding that of the cylindrical portion of the main body, and a cross-cut detachable flange removably seated in said seat and having that portion engaging the seat conforming to the contour thereof.

In testimony whereof I affix my signature in presence of two witnesses.

LOUIS H. PERLMAN.

Witnesses:
I. B. LEIBSON,
O. W. MORN.